United States Patent
Cadd et al.

(10) Patent No.: US 6,353,617 B1
(45) Date of Patent: Mar. 5, 2002

(54) METHOD FOR ACCESSING A COMMUNICATION MEDIUM

(75) Inventors: Jimmy W. Cadd, Coral Springs; Juan Carlos Palacios, Plantation, both of FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/547,238

(22) Filed: Apr. 11, 2000

(51) Int. Cl.[7] .............................................. H04L 12/413
(52) U.S. Cl. ..................... 370/445; 370/447; 370/348
(58) Field of Search ................. 370/445, 447, 370/431, 458, 462, 463, 461, 443, 465, 468; 310/416, 418, 910, 229, 230, 348, 322

(56) References Cited

U.S. PATENT DOCUMENTS

| | | | |
|---|---|---|---|
| 4,398,289 A | 8/1983 | Schoute | 370/93 |
| 4,630,264 A * | 12/1986 | Wah | 370/447 |
| 4,672,608 A | 6/1987 | Ball et al. | 370/93 |
| 4,866,709 A | 9/1989 | West et al. | 370/82 |
| 5,103,445 A | 4/1992 | Ostlund | 370/79 |
| 5,953,344 A * | 9/1999 | Dail | 370/443 |

* cited by examiner

Primary Examiner—Douglas Olms
Assistant Examiner—Ricardo M. Pizarro
(74) Attorney, Agent, or Firm—Scott M. Garrett (57) ABSTRACT

A medium access protocol which adjusts number of contention slots in a variable length frame and superimposes a variable window structure over the frame structure. The number of contention slots (24) in a frame (28, 30) is changed on a frame by frame basis by determining if a collision occurred in any contention slot (44). If not the contention slot is removed (48) and if so, the number of slots is increased (52). In high traffic situations, if the average load is greater than a threshold (107, 120) the number of frames in a window is increased (130). If the load drops below the threshold (120), the number of frames per window is decreased (124).

17 Claims, 5 Drawing Sheets

METHOD FOR ACCESSING A COMMUNICATION MEDIUM

FIELD OF THE INVENTION

This invention relates generally to the field of accessing a communication medium. More particularly, certain embodiments of this invention relate to accessing a framed and slotted communication medium such as those complying with MPT1327, Tetra and similar protocols.

BACKGROUND OF THE INVENTION

Wireless trunking communication systems utilize two or more communication channels to effect communication between two or more parties. One channel is utilized as a control channel which allocates the remaining communication channels to the users. The function of this control channel, for purposes of this document, is to set up calls between users.

In order to set up a call, a radio user initiates a call setup process by communicating with a central controller via the control channel with a request that a call be set up. The central controller then takes the remaining steps needed to set up the communication on one of the available communication channels.

The MPT1327 specification is published by the department of trade and industry (DTI) in the U.K. and it details a common signaling standard for land based trunked radio systems operating primarily in the U.K.'s VHF Band III Sub-band 1 & 2. Although this is a U.K. standard, this protocol has become a widely used standard for trunking systems across the world. The Tetra (Terrestrial Trunking Radio) standard is a newer standard that is growing in popularity throughout the world and may become the de-facto standard in the future. These standards, and other similar standards, define almost all of the communications activities of the communication system. Such activities include the signaling on the control channel that takes care of (among other things) the call set-up process. In order to set up a call, the control channel (a common channel) is accessed by the subscriber unit that is requesting a call. Since the calls in this type of system (and many others) are requested randomly, the method for accessing the control channel is often generically referred to as a Random Access Method. These access methods are often variations of the well known "Slotted ALOHA" Random Access Method.

Generally speaking, the central system controller communicates with the radios in the system over the control channel using a repeating frame of information. The frame contains control information as well as a series of contention slots. The contention slots are made available to the radio units for purposes of securing access to the control channel. According to most Random Access standards, there is defined a minimum and maximum number of slots in the frame. The equipment manufacturers have freedom to determine how many contention slots are in the frame at any given time subject to this minimum and maximum.

In order for a radio to place a call request message, it first has to select one of the contention slots on the control channel allocated for call request purposes. The contention slot accessed is generally selected randomly so that if several radios are attempting to secure a contention slot, their signals are unlikely to collide. Of course, as traffic load on the system increases, collisions become more frequent as the radios attempt to secure use of the same slot. This results in inefficient use of the control channel and delays in securing a call set up. This problem is generally addressed by increasing the number of contention slots per frame. This provides more contention slots from which each radio can randomly select, thus, reducing the probability of collision. As a channel becomes less loaded, fewer contention slots are needed to more efficiently use the channel capacity.

Several techniques have been devised to optimize the number of contention slots in systems such as this and thereby minimize channel access delay and make the most efficient use of the control channel's bandwidth. Known techniques often require the radios to report statistics back to the central controller. The central controller accumulates and uses these statistics to make a determination of channel loading based on these statistics. Unfortunately, this reporting process uses control channel bandwidth, and thus, may contribute to inefficient use of the control channel. Delays can actually increase and traffic throughput can decline.

U.S. Pat. No. 4,398,289 to Schoute shows one example of a variation in the slotted ALOHA protocol which adjusts the frame length in accordance with the traffic on a channel. The technique used in this patent is simulated and compared with standard slotted ALOHA and the present invention at a later point in this document and is referred to as "Load Estimation."

There is need for a method for allocating the contention slots in such a system which can operate efficiently and preserve data throughput while minimizing delays. It is advantageous if such method is quickly adaptive, simple to implement and flexible.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

DETAILED DESCRIPTION OF THE INVENTION

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

Figure 1:
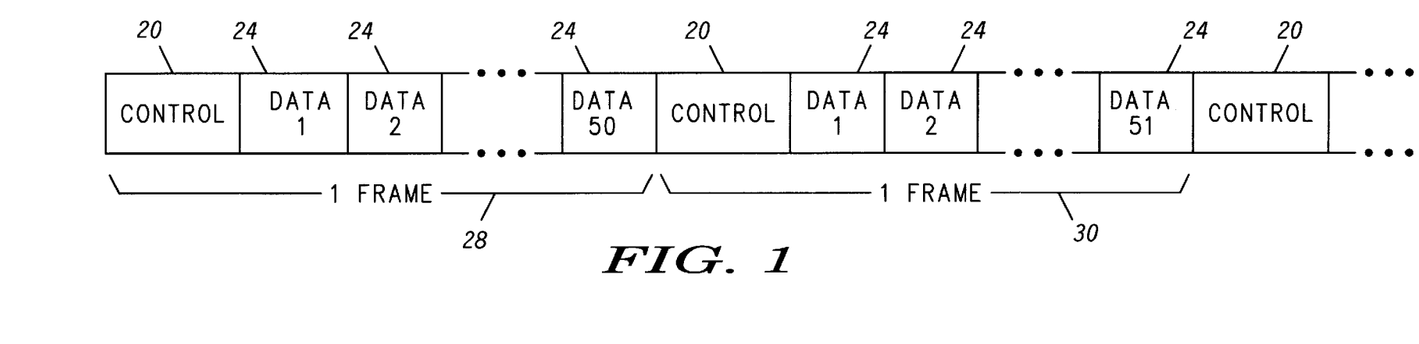
FIG. 1 is a diagram of the control channel frame structure for MPT1327 networks, Tetra networks and similar networks.

Turning now to FIG. 1, there is shown a diagram of the frame structure of a system according to the present invention. This structure is also the structure of many systems employing a Random Access Method including MPT1327 and Tetra compliant systems. In this arrangement, a control slot 20 is allocated in each frame 28 to provide call setups and other outgoing information from the central controller. After this control slot 20 there is a series of contention slots 24. One complete frame is made up of the control slot 20 plus a defined number of contention slots 24 so that a first frame is shown as 28 and a second frame is shown as 30. Note that frame 28 is shown as having $S_0$ contention slots, wherein $S_0$ is 50, and frame 30 is shown as having $S_1$ contention slots, wherein $S_1$ is 51, since the number of slots per frame can vary depending on a number transmitted by the central controller during the control slot.

Figure 2:
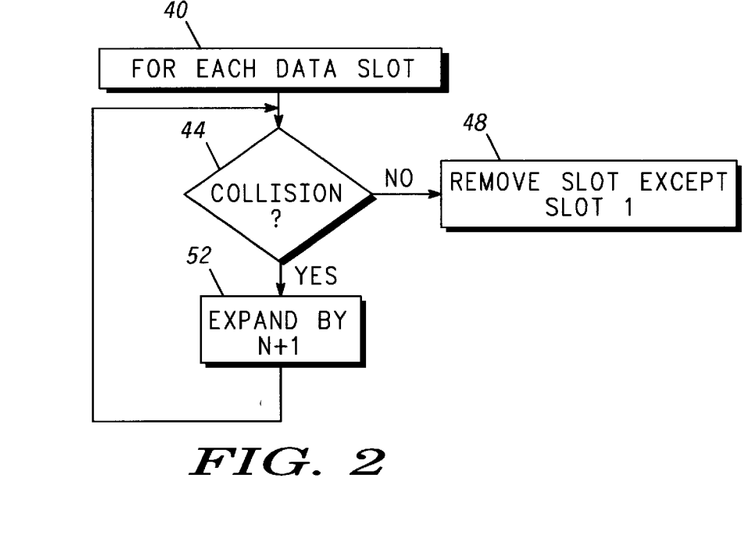
FIG. 2 is a general flow diagram describing the Tree Algorithm which determines the number of contention slots in the next frame based upon the number of contention slots in a current frame, in accordance with an embodiment of the present invention.

According to an embodiment of the present invention, the number of contention slots per frame can be adjusted using a very simple and rapidly responding algorithm which is generally described in FIG. 2. According to this algorithm, contention slot 1 is always retained in the frame structure—that is, there is always at least one contention slot per frame. Those of ordinary skill in the art will understand that any number of contention slots could be defined as the minimum number available in a frame without departing from the present invention. For each contention slot, the algorithm determines if a collision occurred during that contention slot. This can be readily determined for many instances by the central controller on the basis of whether or not the data received during that slot was corrupted, damaged or otherwise mutilated. If the data was corrupted for reasons other than a collision of data from two or more radios attempting to access the same contention slot, it is still considered a collision. The algorithm adapts very quickly and occasional errors in making this determination will not cause significant problems.

For each contention slot, the central controller determines (without need for collection of statistics by the radio units) at 40 whether or not a collision occurred at 44. If not, that contention slot is removed from the frame at 48 unless it is the first slot (or other minimum defined number of contention slots required by the protocol). So, for each contention slot that was not involved in a collision, the frame will be shortened by one contention slot in the next frame subject to minimum contention slot constraints of the protocol. If a collision occurs on any contention slot, then the number of contention slots is expanded geometrically at 52. For example, for each corrupted contention slot, the number of slots increases by N+1 where N is an integer. In simulated systems, N=1 was found to be suitable. For N=1, two contention slots appear in the next frame for each contention slot involved in a collision in the current frame. So, in summary, the number of contention slots in each frame is adjusted based upon the number of collisions which occur in the preceding frame. In accordance with this preferred implementation, the number of contention slots in any frame $S_k$ is given by:

$$S_k = S_{(k-1)} - P + [M \cdot (N+1)] \qquad \text{equation (1)}$$

where:

$S_k$ is the number of contention slots in frame number k, $S_{(k-1)}$ is the number of contention slots in frame number (k-1) the frame preceding frame number k, N is an integer, M is the number of contention slots with collisions in frame (k-1) and P is the number of contention slots with no collisions in frame (k-1).

In the case of N=1, this relationship simplifies to:

$$S_k = S_{(k-1)} - P + 2M \qquad \text{equation (2)}$$

In each case above (equations 1 and 2), for systems which define a minimum and/or a maximum number of contention slots per frame, the number of slots is constrained by the protocol defined minimum and/or maximum. That is, if by system design the number of slots cannot be less than three or greater than 50, then the above equations are modified so that if $S_k<3$, then $S_k$ is set to 3 and if $S_k>50$ then $S_k$ is set to 50.

Because this algorithm operates dramatically on a frame by frame basis, the system frame size adapts very quickly. The size of the frame can expand very rapidly and collapse extremely rapidly in response to changing traffic loads. For example, consider a system operating according to equation 2 with a minimum number of slots per frame=one and a maximum number of slots per frame=35. If frame k-1 has 10 contention slots and no collisions occur, frame k will have only contention slot number 1.

Similarly, if frame k-1 has 10 contention slots and has collisions in all 10 contention slots, frame k will have 20 contention slots. If traffic is so heavy that frame k experiences collisions on all 20 contention slots, then frame k+1 would have 20+20=40 contention slots, but for the maximum slot limit. Because of the maximum slot limit, the controller would set the number of slots per frame to the maximum of 35 slots. Taking this example one frame further, if frame k+1 experiences no collisions, then frame k+2 will have only the minimum number of contention slots—in this example, only contention slot number 1 remains. Thus, in two consecutive frames the number of contention slots can go from the maximum number to the minimum number.

The fact that this algorithm depends only on the preceding frame to determine how many slots are to be placed on the subsequent frame allows for very fast adaptation of the frame size. Since the number of contention slots depends only on a small sample of information, it is possible that the system can adapt in the wrong direction for average traffic conditions. For example, it is possible for a reduction in the number of contention slots in a subsequent frame when average traffic is actually increasing, and vice versa. The rapid response of this algorithm causes such instantaneous errors to be of little concern since the system will very rapidly adapt to the instantaneous traffic load to correct for this situation very quickly (probably the next frame).

Several algorithms that control the access frame length on a medium access scheme, attempt to increase the frame length when the channel is considered to be highly congested. The idea is that by increasing the number of slots per frame, the probability of collision can be maintained at a certain level preventing the throughput from collapsing. However most of the protocols impose a maximum number of slots per frame in order to maintain delay at a certain level (e.g. for MPT1327, the frame length is 25 contention slots). The present invention maintains a high level of throughput for traffic loads above the typical overflow point, while meeting the maximum frame length requirement so that the delay will be maintain at an acceptable level.

In a typical Random Access System under conditions of heavy traffic, even an algorithm which holds the number of contention slots at a maximum value will reach a state of saturation wherein delays in obtaining access to the control channel become very substantial. This state of saturation arises after the throughput of the channel reaches a peak, after which, when the traffic offered on the channel increases, throughput degrades to perhaps only about 0.1 or less of offered traffic (a level which is often less than about ¼ of that obtained under peak throughput conditions). While all delays cannot be eliminated and throughput necessarily suffers whenever collisions occur in a system such as this, substantial improvements can be made. At the point where data traffic reaches a threshold approaching the level of peak throughput, an embodiment of the present invention contemplates an enhancement to the above algorithm. This enhancement is described in connection with FIGS. 3 and 4 and is referred to hereinafter as a Window Spreading Algorithm.

Figure 3:
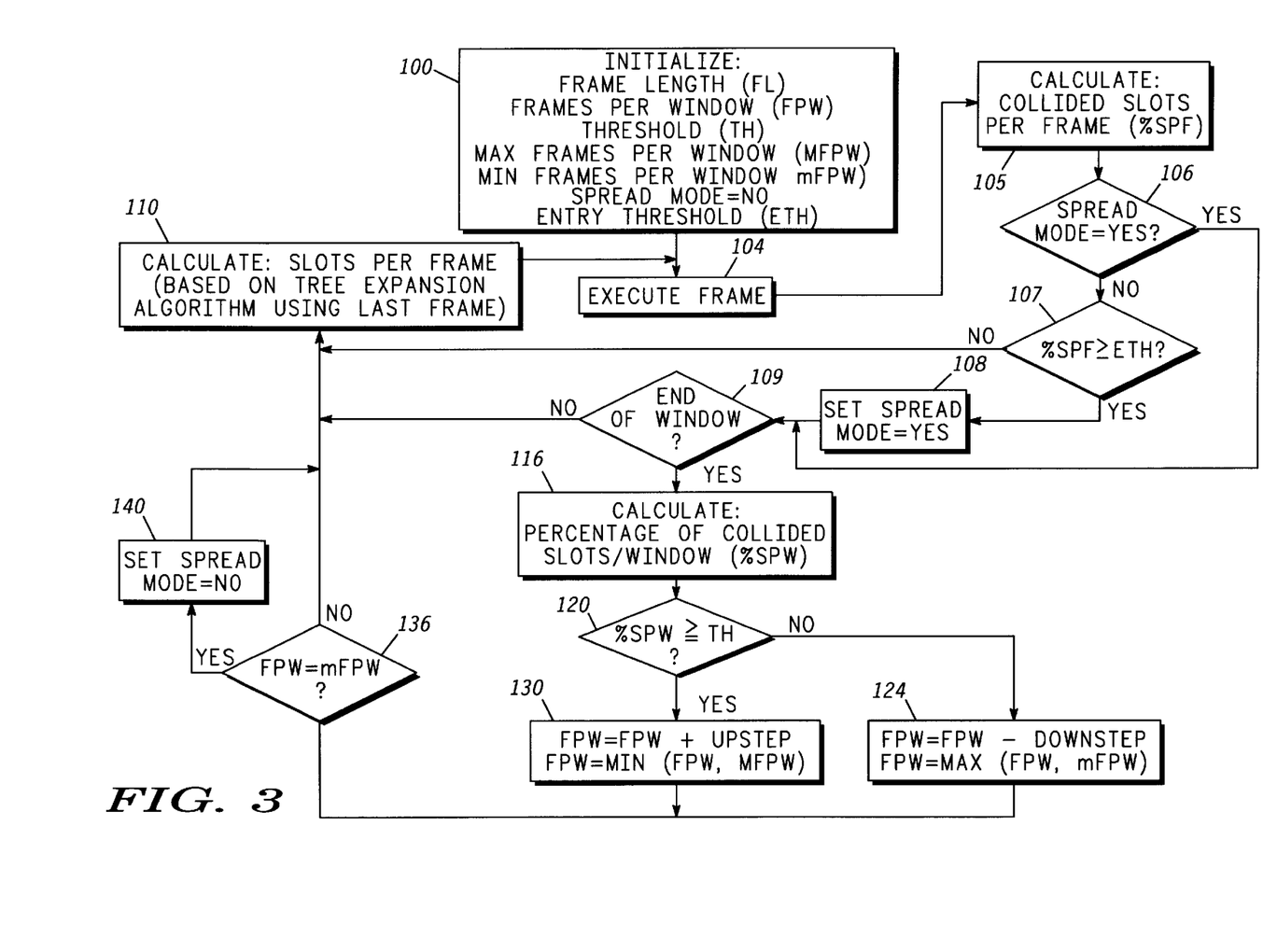
FIG. 3 is a flow chart describing an implementation of the Window Spreading algorithm of an embodiment in accordance with the present invention.

Referring now to FIG. 3, the present Window Spreading enhancement involves superimposing a dynamically changing window structure on the frame structure. The algorithm described above in connection with FIG. 2 is referred to hereinafter as a Tree Expansion since the number of contention slots can increase like a binary tree. The effective number of contention slots available can be increased in this algorithm by superimposing a window structure on the frames to increase the throughput for high traffic loads while maintaining the delay at an acceptable level.

Referring now to FIG. 3 generally, when traffic conditions are estimated to be above a certain threshold level (ETH), the Window Spreading algorithm is enabled. Once the traffic drops below a threshold (TH), the Window Spreading algorithm is disabled. Two different thresholds are used in this embodiment, but this is not to be limiting. In the Window Spreading mode, each radio unit randomly chooses a frame from the current window. Once the selected frame is established, the radio unit randomly chooses a contention slot from the frame. The idea is to provide the radio units with a larger number of contention slots to choose from than the maximum number contemplated by the protocol. In the method of this embodiment of the invention, the probability of collision might sometimes increase, but overall throughput can be maintained while maintaining an acceptable level of delay. This is because the window structure does not affect the waiting period of the individual radio units. If a radio unit is transmitting a request for the first time, it only needs to wait for the beginning of the next frame regardless the number of frames in the actual window. If a radio unit is re-transmitting a request after a collision, it does not need to wait until the end of the present window, it only needs to wait until the beginning of the next frame.

So, examining FIG. 3 in detail, at 100 the system first initializes the frame length (FL), the number of frames per window (FPW), the threshold for entering the Window Spreading algorithm (ETH), the threshold for adding the window spreading algorithm (TH), the maximum number of frames per window (MFPW) and the minimum number of frames per window (mFPW). The Spread mode (a flag indicating whether or not the system is operating using the Window Spreading algorithm) is initially set as "NO". The frame is executed at 104, which means that the central controller sends and synchronizes the contention slots while at the same time the central controller monitors for an incoming call request on the inbound channel. The number of frames per window is transmitted in the control word 20 of every frame 28. Also, during the execution of a frame, the controller accounts for slots in which a collision occurs.

At 105, a calculation is made to determine if it is appropriate to enter the spreading mode. This is a running calculation, in the current embodiment, in which the number of collided slots is examined on the three preceding frames and is represented symbolically as %SPF (three numbers for three frames). At 106, a determination is made as to the status of the Spread mode. If the Spread mode="NO", then control passes to 107 where the %SPF numbers of 105 are compared with the threshold ETH to determine if they all exceed this threshold (ETH). For example, if each of the three preceding frames have more than 75% collided frames (i.e. ETH=75%), it is deemed appropriate to set the Spread mode to "YES" at 108. Other threshold percentages and measurement techniques may be appropriate depending upon the system. Once the Spread mode is set to "YES" at 108, control passes to 109. If the Spread mode was already "YES" at 106, control passes directly to 109 bypassing 107 and 108. If the threshold ETH is not met or exceeded at 107, control passes directly to 110.

The number of slots per frame is decided at 110 using the number of collided slots in the previous frame. The controller then starts making contention slots available to the radio units.

At 109, the end of a frame is encountered. If the end of a window has not been processed at 109, control passes to 110 where the number of slots per frame is calculated based upon the Tree Expansion algorithm and the process returns to 104. If at 109, the end of the window has been reached, the number of collided slots per window is computed as a percentage as an indicator of traffic loading at 116. If this number (%SPW) is not greater than or equal to the threshold TH at 120, the number of frames per window FPW is reduced (for example by one) subject to the minimum number of frames mFPW at 124. If the average at 120 is greater than or equal to the threshold TH at 120, then the number of frames per window (FPW) is increased (for example by one) subject to the maximum number of frames per window MFPW at 130.

From 124 and 130, control passes to 136 where the number of frames per window (FPW) is examined and compared with the minimum value (generally 1). If the number of frames per window is at the minimum, it is an indication that the Spread mode is not needed and the spread mode is set to "NO" at 140. Control then passes back to 110 as before. If the FPW is not equal to the minimum, then control passes directly back to 110. Thus, when the threshold TH is exceeded, the number of windows grows, subject to the maximum. When the threshold TH is not exceeded, the number of windows shrinks subject to the minimum. When the minimum number of frames per window is reached, the Spread mode is immediately shifted to "NO" at 140. In certain implementations of the invention, the Spread mode is initially entered when three consecutive frames have more than 75% collided frames. The first time through the process after meeting this criteria, the Spread mode is entered at 108. In this implementation, TH is set to 50% collided slots per window. Thus, when 120 is reached, the number of frames per window will be increased at 130 and the Spread mode will be retained at 136. As soon as %SPW is not greater than or equal to TH at 120, and the FPW reaches the minimum mFPW at 124, the Spread mode will be exited at 140.

Those having ordinary skill in the art will understand that the above process should appropriately account for startup conditions based upon the particular system parameters and operational parameters selected. For example, a calculation in 105 of percentage of collided contention slots in three consecutive frames is only valid after the first three frames occur.

As described briefly above, a simple and practical way of estimating the traffic conditions at the central controller without need for reporting by the radio units is by monitoring the number of collided slots per frame. However, the frame length parameter can also be readily used as a measure of traffic loading for purposes of comparison with TH and/or ETH. As stated previously, most of the algorithms attempt to increase the frame length if previous frames are considered highly congested. Experience has shown (and it is intuitive) that when the traffic load is above the overflow point, the frame length parameter will rapidly increase to the maximum limit and will tend to remain there for as long as the overloaded traffic condition remains. It can be concluded that there is a direct relation between the average length of consecutive frames and whether the offered traffic is above the overflow point. Based on this, in an alternative embodiment, the central controller can determine if the traffic load is above the overflow point just by averaging the length of previous consecutive frames. No information from the radio units is needed.

Although not explicitly shown in FIG. 3, those of ordinary skill in the art will understand that the frame length and number of frames per window and related data are transmitted to the radio units in the control portion of the frame. This enables each radio unit to determine which and how many contention slots are available for use. Those of ordinary skill in the art will also understand that the present embodiment uses two thresholds to determine entry into the Spreading mode (use of the Window Spreading Algorithm). Other arrangements could be devised which use a single threshold or other thresholds or other measures of traffic loading for the Window Spreading algorithm than those disclosed without departing from the invention.

Figure 4:
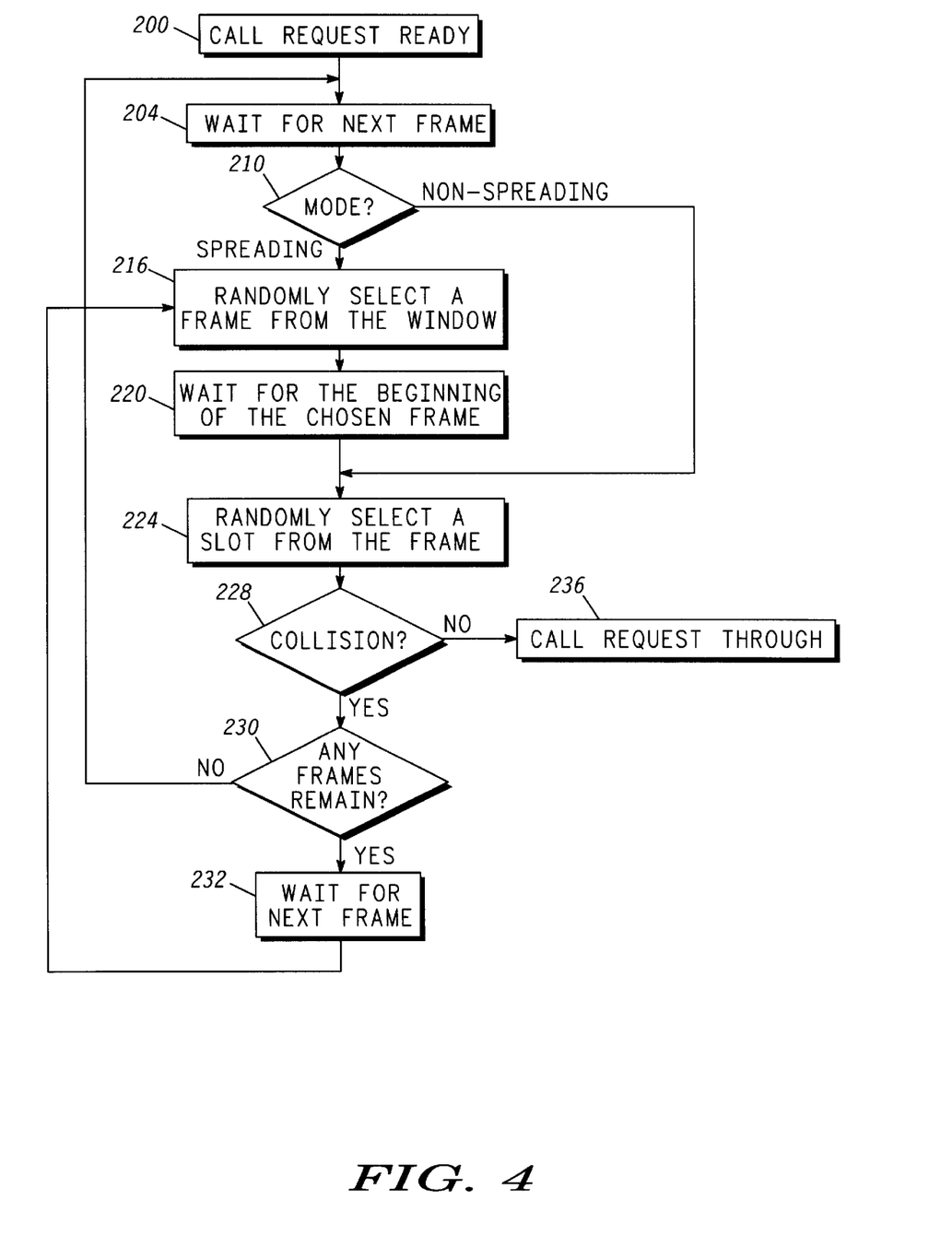
FIG. 4 is a flow chart of the operation of a radio unit under a system using the Tree Algorithm and the Window Spreading algorithm in accordance with embodiments of the present invention.

FIG. 4 describes operation of a radio unit under the system described in conjunction with FIGS. 2 and 3. At 200, the radio unit has a call request ready to transmit to the central controller in order to arrange a call setup. The next frame is awaited at 204 where the radio unit then determines at 210 from the control portion of the frame whether the system is in window spreading mode or not, the window size (if in the spreading mode), and how many contention slots are available in the next frame (note that the number of contention slots can vary from frame to frame). If the system is in Window Spreading mode (i.e. using the Window Spreading algorithm), the radio unit then identifies the frame as the first frame of a first window and randomly selects a frame from the first window at 216 and awaits the beginning of the selected frame at 220. The radio unit then randomly selects a contention slot from the selected frame at 224 and places the call request data in the selected contention slot. If a transmission fails due to a collision occurring at 228, the radio unit will know because the central controller will not set up a call or otherwise acknowledge the call setup request. If a failure occurs at 228, then at 230, the radio unit determines whether any frames remain in the first window. If no frames remain, then the radio unit waits for the next frame at 204, and the process continues for a new window that begins at the next frame and has a current window size (CWS) defined in the next frame. If one or more frames remain, then the radio unit waits for the next frame at 232 and randomly selects one of the remaining frames at 216, after which the process continues. (If there is but one frame left, then, of course, the random selection is that frame. If no collision occurs at 228, the call request goes through at 236. If, at 210, the system is not in Window Spreading mode, 216 and 220 are bypassed since the window is effectively a window of one frame and the process resumes at 224. Note that each radio counts and keeps track of the window size from the beginning to the first frame it encounters and determines a new window size only after the completion of each current window, so that the windows of one radio unit are not necessarily aligned with those of other radio units or the central controller.)

Figure 5:
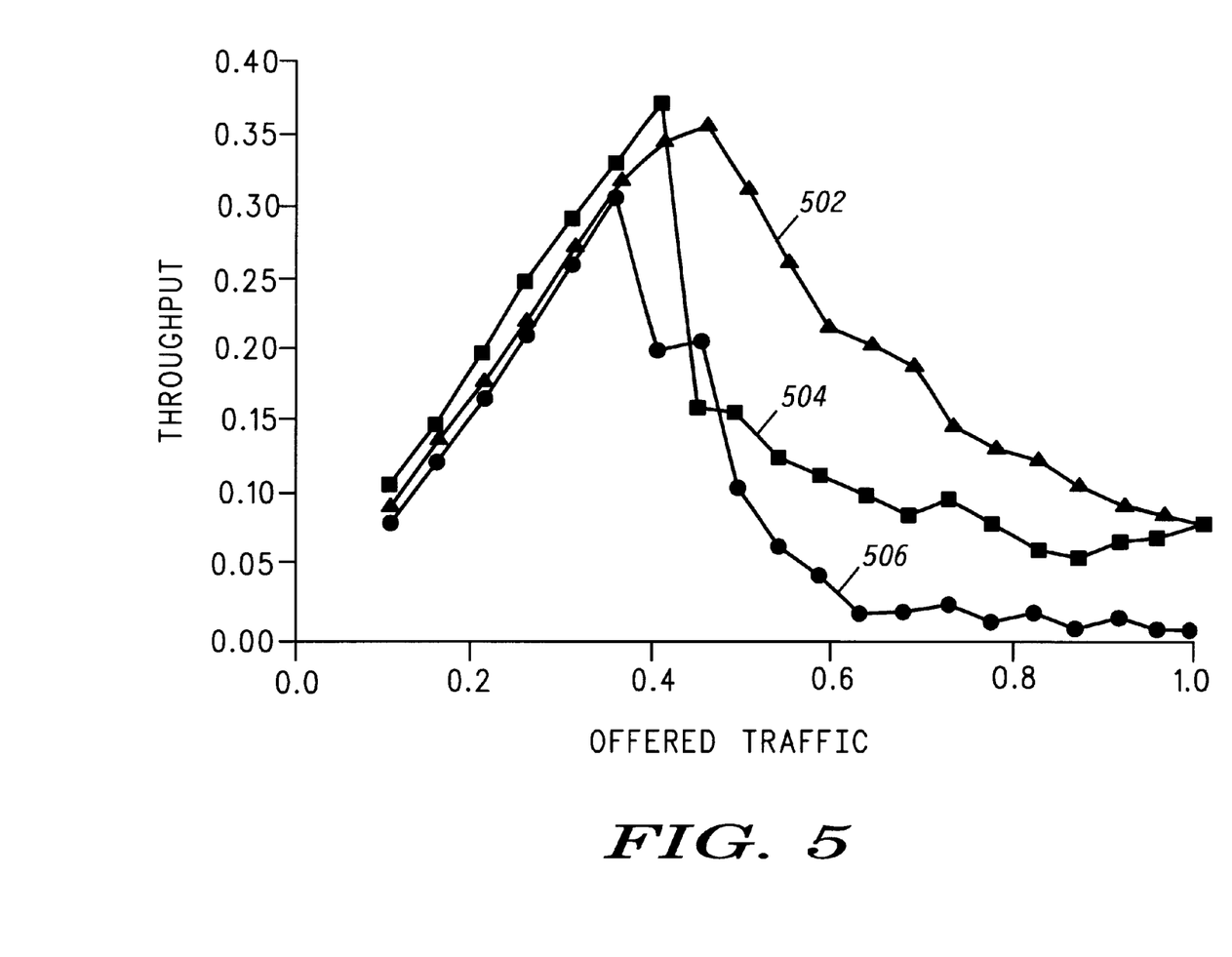
FIG. 5 is a chart of a simulation of throughput comparing an embodiment of the present invention with two other techniques.

Referring now to FIG. 5, throughput with an embodiment of the Tree Expansion and Window Spreading algorithms of the present invention is compared with that of a slotted ALOHA system and the Load Estimation algorithm described earlier. Tree Expansion and Window Spreading throughput is shown as 502, while Load Estimation is shown as 504 and slotted ALOHA is shown as 506. In each case shown in FIG. 5 (as well as FIG. 6), the data is from a simulation carried out with the following parameters.

For purposes of simulating each of the above algorithms, a maximum number of contention slots per frame=25 and a minimum number of contention slots per frame=1 was used. For the Tree Expansion algorithm, the number of slots added for each collided slot (N) was set equal to 1. For the Window Spreading algorithm, the maximum number of frames per window=5 and the minimum number of frames per window=1. The criteria used as a threshold for initially entering the Window Spreading algorithm (ETH) was for 75% or more of the slots to be collided in three or more consecutive frames. After entry into the Window Spreading mode, the threshold for incrementing or decrementing the window size (TH) was for 50% or more of the slots in the entire window to be collided. If the number of frames per window drops to the minimum (1 in this example) the Window Spreading mode can be considered exited and the system can be considered as operating only under the Tree Expansion algorithm according to this simulation. Thus, there is a higher threshold for entry into the Window Spreading mode than to exit it.

Of course, those having ordinary skill in the art will appreciate that the above parameters may not be optimal for a real world system. Some level of experimentation is to be expected in order to optimize the performance of any given system to take full advantage of any of these algorithms.

Figure 6:
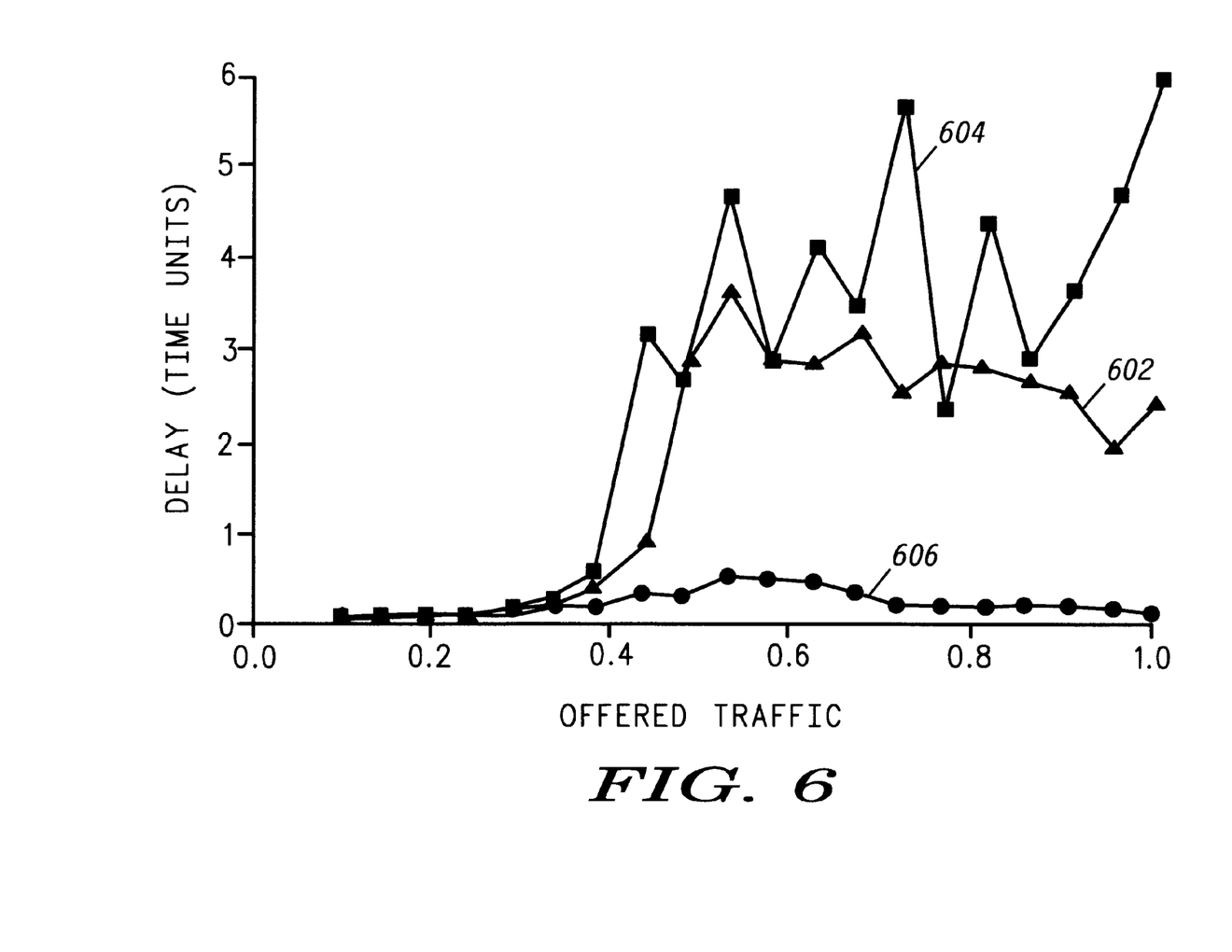
FIG. 6 is a chart of a simulation of delay performance comparing an embodiment of the present invention with two other techniques.

In the graphs of FIGS. 5–6, the horizontal axis represents Normalized Offered Traffic. Normalized Offered Traffic represents, on average, the inverse of the number of contention slots available for each call request. A Normalized Offered Traffic of 1.0 means there is, on average, one contention slot per call request. A Normalized Offered Traffic of 0.5 means that there are, on average two contention slots available for each call request, and so on. The Offered Traffic was simulated using a Poisson distribution of call requests.

On the vertical axis labeled "Throughput" in FIG. 5, throughput is measured in terms of a fraction of the number of slots available which are successfully filled. That is, throughput=number of successfully filled slots divided by the total number of slots.

In this simulation, it can be seen from FIG. 5 that the peak throughput of the Tree Expansion and Window Spreading algorithms embodiment of the present invention exceeds that of slotted ALOHA and approaches that of Load Estimation. But more importantly, at higher levels of loading, system throughput of the present invention is dramatically improved over both systems up to load levels of offered traffic equaling 1. Each system achieves peak throughput at roughly Offered Traffic levels between 0.3 and 0.5 and are roughly equivalent in performance until the curves peak. At higher offered traffic levels (e.g. greater than 0.4) both slotted ALOHA and Load Estimation rapidly degrade in their ability to provide efficient throughput. It is above these levels that the Tree Expansion and Window Spreading algorithms of the present embodiment of the invention excels. In this example, it is approximately at the throughput peak when the Window Spreading algorithm exceeds the Offered Traffic threshold and begins to play a part in the algorithm.

Referring now to FIG. 6, the performance as measured by delay time for the same three systems is shown. Delay time for the Tree Expansion and Window Spreading algorithms of the present invention is shown as 602. The delay time for Load Estimation is shown as 604 and for slotted ALOHA is shown as 606. While the delay time of the Tree Expansion and Window Spreading algorithms of the present invention is generally longer than that of slotted ALOHA, the delay time, at about 3 time units (e.g. 3 seconds under the simulation parameters for MPT1327 which were used), remains acceptable for a system of this type while throughput is dramatically improved over slotted ALOHA. Compared with the Load Estimation algorithm, delay is generally better under high traffic conditions while throughput is significantly improved.

The use of both the Window Spreading and the Tree Expansion algorithms of the present invention provides the advantages of reasonable delay and strong improvement in throughput. However, those having ordinary skill in the art will appreciate that either of these algorithms and modifications thereof can be used independently without departing from the present invention. Moreover, while the particulars of these algorithms are outlined above, many minor variations are possible without departing from the invention. For example, the present Tree Spreading algorithm geometrically increases the number of slots for each collided slot, but other variations could be used. Similarly, slots are deleted from subsequent frames if no collision occurs at a particular slot. Variations of this are possible by, for example, deleting a slot for every two slots without collisions. Similar variations in the Window Spreading algorithm are also possible and contemplated by the present invention. Thus, the above description should only be considered as an example of the type of algorithm that can be applied by using the number of collisions in a slot as a basis for determining frame and window parameters. In other variations, a small number of frames (e.g. two to ten) can be examined for collisions to determine channel loading. Such a system would react somewhat slower to changing traffic conditions, but might more accurately characterize the channel loading.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. A method used in a central controller of a communication system for adjusting a number of contention slots in a variable length frame protocol, comprising:

determining whether a collision has occurred in each of $S_{(k-1)}$ contention slots in a frame number (k−1);

for each of M contention slots in the frame number (K−1) in which a collision occurred, replacing each of the M contention slots for a subsequent frame by a number of contention slots equal to (N+1), where N is a positive integer; and for each of P contention slots in the frame number (K−1) in which no collision occurred, removing each of the P contention slots for the subsequent frame;

so that a number of contention slots, $S_k$, in a subsequent frame is given by:

$$S_k = S_{(k-1)} + M^*(N+1) - P.$$

2. A method in accordance with claim 1, wherein the number of contention slots per frame is limited to a range between a minimum and a maximum number.

3. A method in accordance with claim 1, wherein the frame conforms to one of the Tetra and the MPT1327 standard frame definition.

4. A method in accordance with claim 1, wherein each frame resides in a window having one or more frames; and further comprising:

determining whether a communication channel has traffic exceeding a threshold traffic level;

if the traffic does not exceed the threshold traffic level, reducing the number of frames per window; and if the traffic exceeds the threshold traffic level, increasing the number of frames per window.

5. A method in accordance with claim 4, wherein the number of frames per window is limited to a range between a minimum and a maximum number.

6. A method in accordance with claim 4, wherein the traffic is measured by examining a number of collisions.

7. A method in accordance with claim 4, wherein the traffic is measured by examining a frame length.

8. A method used in a central controller of a communication system for adjusting a number of contention slots in a variable length frame, comprising:

making a determination of a level of channel traffic by examining a number of collisions in a preceding frame;

changing the number of slots per frame on a current frame based on the level of channel traffic;

wherein each frame resides in a window having one or more frames;

changing the number of frames per window according to the level of channel traffic;

determining whether the level of channel traffic exceeds a threshold traffic level;

if the level of channel traffic does not exceed the threshold traffic level, reducing the number of frames per window; and if the level of channel traffic exceeds the threshold traffic level, increasing the number of frames per window.

9. A method in accordance with claim 8, wherein the level of channel traffic on the preceding frame is determined solely by a number of collisions in contention slots of the preceding variable length frame.

10. A method in accordance with claim 8, wherein the number of frames per window is limited to a range between a minimum and a maximum number.

11. A method in accordance with claim 10, wherein the number of frames per window is initially increased beyond one only if a number of slots per frame exceeds a starting threshold for a plurality of consecutive frames.

12. A method in accordance with claim 8, wherein making a determination is carried out by determining whether a collision has occurred in each of $S_{(k-1)}$ contention slots in a preceding frame number (k−1) where $S_{(k-1)}$ is a number of contention slots in preceding frame number (k−1).

13. A method in accordance with claim 12, wherein the number of contention slots is changed by:

for each of M contention slots in the frame number (K−1) in which a collision occurred, replacing each of the M contention slots for a subsequent frame by a number of contention slots equal to (N+1), where N is a positive integer; and for each of P contention slots in the frame number (K−1) in which no collision occurred, removing each of the P contention slots for the subsequent frame;

so that a number of contention slots, $S_k$, in a subsequent frame is given by:

$$S_k = S_{(k-1)} + M*(N+1) - P.$$

14. A method used in a central controller of a communication system for adjusting a number of contention slots in a variable length frame protocol, comprising:

determining whether a collision has occurred in each contention slot in the frame;

if a collision occurred in any contention slot, increasing the number of contention slots for a subsequent frame subject to a maximum number of slots;

if no collision occurred in a contention slot, decreasing the number of contention slots for a subsequent frame by the number of contention slots having no collisions subject to a minimum number of contention slots;

determining whether the communication channel has traffic exceeding a threshold traffic level;

if the traffic does not exceed the threshold traffic level, reducing the number of frames per window; and if the traffic exceeds the threshold traffic level, increasing the number of frames per window.

15. A method in accordance with claim 14, wherein the increasing comprises geometrically increasing.

16. A method in accordance with claim 14, wherein if no collisions occur in any of the frame's slots, the number of slots on the subsequent frame is decreased to a minimum number.

17. A method in accordance with claim 14, wherein the number of frames per window is limited to a range between a minimum and a maximum number.

* * * * *